United States Patent
Ray

(10) Patent No.: US 7,697,617 B2
(45) Date of Patent: Apr. 13, 2010

(54) SYNCHRONISATION METHOD AND APPARATUS FOR OFDM SYMBOLS

(75) Inventor: Andrew Michael Ray, Glenrothes (GB)

(73) Assignee: 4I2I Communications Limited, Aberdeen (GB)

(*) Notice: Subject to any disclaimer, the term of this patent is extended or adjusted under 35 U.S.C. 154(b) by 1067 days.

(21) Appl. No.: 10/778,874

(22) Filed: Feb. 13, 2004

(65) Prior Publication Data

US 2004/0233837 A1 Nov. 25, 2004

(30) Foreign Application Priority Data

Feb. 15, 2003 (GB) .................... 0303546.6

(51) Int. Cl.
*H04K 1/10* (2006.01)

(52) U.S. Cl. .............. 375/260; 375/297; 375/344; 375/299; 375/264; 375/349

(58) Field of Classification Search ........... 375/297, 375/260, 344, 210, 264, 299, 349; 370/207, 370/208; 330/284
See application file for complete search history.

(56) References Cited

U.S. PATENT DOCUMENTS

| 5,598,436 | A | * | 1/1997 | Brajal et al. ............. 375/297 |
| 5,745,535 | A |   | 4/1998 | Mori |
| 5,812,523 | A | * | 9/1998 | Isaksson et al. .......... 370/208 |
| 5,852,630 | A | * | 12/1998 | Langberg et al. ......... 375/219 |
| 6,111,919 | A |   | 8/2000 | Yonge, III |
| 6,438,186 | B1 |  | 8/2002 | Strait |
| 7,020,074 | B1 | * | 3/2006 | Rickard et al. ........... 370/210 |
| 2002/0075797 | A1 | * | 6/2002 | Kilani .................. 370/208 |
| 2004/0001430 | A1 |   | 1/2004 | Gardner |
| 2004/0105512 | A1 | * | 6/2004 | Priotti .................. 375/340 |
| 2004/0120409 | A1 | * | 6/2004 | Yasotharan et al. ...... 375/260 |
| 2004/0156309 | A1 | * | 8/2004 | Chadha et al. .......... 370/208 |

FOREIGN PATENT DOCUMENTS

| EP | 0 930 751 A1 | 7/1999 |
| EP | 1 267 535 | 12/2002 |
| GB | 2 324 447 A | 10/1998 |
| GB | 2 364 221 | 1/2002 |
| WO | WO 03/001760 A1 | 1/2003 |
| WO | WO 03/028205 A1 | 4/2003 |

OTHER PUBLICATIONS

International Search Report corresponding to GB0403114.2 dated Oct. 9, 2006.
International Search Report dated May 28, 2004.

* cited by examiner

*Primary Examiner*—Shuwang Liu
*Assistant Examiner*—Kabir A Timory
(74) *Attorney, Agent, or Firm*—RatnerPrestia

(57) ABSTRACT

A system and method for synchronising data for use in a powerline communications network.

Data containing a plurality of symbols is received and a predetermined number of data samples are used to calculate an alignment error associated with the data samples. The alignment error represents the extent to which the data samples are aligned with one of the symbols. The alignment error is then used to determine the extent to which the alignment position should be changed so as to provide substantial alignment with a subsequent symbol.

12 Claims, 7 Drawing Sheets

SYNCHRONISATION METHOD AND APPARATUS FOR OFDM SYMBOLS

This invention relates to a system and method of assisting communication with OFDM (Orthogonal Frequency Division Multiplexing) and in particular concerns improved symbol synchronisation to allow improved data transfer.

Due to the increasing power of DSP (Digital Signal Processors) systems OFDM has recently become a viable method for many different communications systems including ADSL, Wireless, xDSL, Powerline, HyperLAN, 802.11a and DVB.

Powerline communication systems are used for communication over electrical wiring circuits. One of the major disadvantages of electrical wiring is the extremely harsh channel. Issues such as capacitive loading from appliances, reflectance from the many wiring loops and noise make the robust design of a communication system very difficult. This has been overcome by using OFDM and powerful forward error correction technologies. Similar communications problems arise with the other mentioned communications standards for which the use of OFDM is available.

OFDM works by splitting the total channel bandwidth available to the system into a number of parallel sub channels. Each sub channel (also know as carrier) is orthogonal with respect to all other sub channels and may thus be recovered independently at the receiver. Hence we can view an OFDM system as comprising a number of independent communications links running in parallel with each other.

Synchronisation to a transmitted signal is a key part in any communications system. An OFDM synchroniser relates to the time synchronisation of a series of OFDM symbols. This process is also known as symbol alignment.

The receiver must align to the symbols transmitted before it can start decoding data. Sometimes this procedure is called training and it generally has the following stages:
1. Detect that a signal is on the line.
2. Receive training symbols and perform symbol alignment (synchronisation).
3. Detect the end of the training symbols and start of data transmission.
4. Decode data.

It would be advantageous to provide a method that may be used to robustly attain symbol alignment, in communications system for which OFDM is useable.

In accordance with a first aspect of the invention there is provided a method for synchronising Orthogonal Frequency Division Multiplexed data in a communications network, the method comprising the steps of:
receiving data containing a plurality of symbols;
obtaining a predetermined number of data samples;
calculating an alignment error associated with the data samples, the alignment error representing the extent to which the data samples are aligned with one of said symbols; and
using the alignment error to determine the extent to which the alignment position should be changed so as to provide substantial alignment with a subsequent symbol.

Preferably, a threshold alignment error value is provided, below which the data is taken to be substantially aligned.

Preferably, the method further comprises verifying that the alignment error is within an acceptable limit by repeating the alignment error calculation on successive symbols without altering their alignment position.

Preferably, the method further comprises determining the phase error between successive symbols.

More preferably, a phase error of substantially 180° is determined.

Preferably, further comprising changing the alignment of position by advancing by n samples and re-calculating the alignment error.

Preferably, the predetermined number of samples is dependent upon the symbol length.

Preferably, the number of samples taken matches the overall symbol length

Preferably, the alignment error is determined by calculating the phase gradient error of the samples and identifying the sample with the smallest phase gradient error.

Preferably, the plurality of symbols are training symbols.

Preferably, the symbols are arranged in sequence and are of a first type and a second type.

Preferably, the symbols of the second type are out of phase with the symbols of the first type.

More preferably, the symbols of the second type are 180° out of phase with the symbols of the first type.

Preferably, the sampled data is a plurality of carriers.

Preferably, the data is frequency domain data.

Preferably, the data is represented in polar co-ordinates.

Preferably, the step of subtracting a known transmitted phase of each carrier from the received phase.

In accordance with a second aspect of the present invention there is provided a system for synchronising Orthogonal Frequency Division Multiplexed data in a communications network, the apparatus comprising:
data reception means for receiving data containing a plurality of symbols;
data sampling means;
alignment error calculating means for calculating an alignment error associated with the sampled data, representing the extent to which the sampled data is aligned with one of said symbols; and
alignment adjustment means for adjusting the symbol length in response to the calculated alignment error.

Preferably, the data reception means comprises an input sequencer for aligning the data to be sampled to the national symbol boundary.

Preferably, the data reception means further comprises Fourier Transform means for transforming the data from the time domain to the frequency domain.

Preferably, the data reception means further comprises means for converting the data from the Cartesian co-ordinates system to the polar co-ordinates system.

Preferably, the data sampling means obtains a predetermined number of data samples.

Preferably, the alignment error calculation means is provided by a Phase Gradient error iterator which calculates the phase gradient error of the samples and identifies the sample with the smallest phase gradient error.

Preferably, a phase error accumulator is provided to calculate the difference between the phase of the current symbol and the phase of the previous symbol.

Preferably, the phase error value to be calculated is 180°.

Preferably, the system which further comprises means for determining the alignment error of a piece of data is below a predetermined threshold value.

Preferably, the number of samples taken by the data sampling means is determined by the symbol length.

A synchronisation controller adapted to control the operation of the method and system according to the invention and to make decisions concerning the synchronisation of data based on information obtained from the system.

In order to provide a better understanding of the present invention, an embodiment will now be described by way of example only and with reference to the accompanying Figures, in which.

Table 1 lists the transitions of the synchronisation state machine.

The invention is a synchronisation method that functions to calculate the alignment position of OFDM symbols and further to detect the transition between training symbols and data transmission. In the preferred embodiment, the invention is in the form of a hardware description language that describes an IC design. It is tested in an FPGA and the design may then be turned into an Integrated Circuit.

Although the embodiments of the invention described with reference to the drawings comprise digital circuit designs in the form of hardware description languages for specification of semiconductor integrated circuits and simulation on computers, the invention also extends to other forms of electronic hardware implementations and computer programs, particularly computer programs on or in a carrier or an embedded system, adapted for putting the invention into practice. The program may be in the form of source code, synthesised code, object code, a code of intermediate source and synthesised or object code such as in partially compiled form suitable for use in the implementation of the processes according to the invention. The carrier may be any entity or device capable of carrying the program or performing the operations described herein.

For example, the carrier may comprise a storage medium, such as ROM, for example a CD ROM or a semiconductor ROM, or a magnetic recording medium, for example, floppy disc or hard disc. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Figure 1:
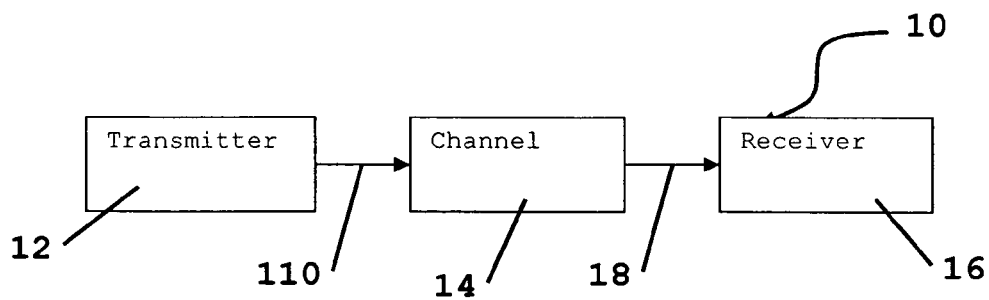
FIG. 1 illustrates, in schematic form, a typical communications system.

FIG. 1 shows a typical communications system 10. The transmitter 12 (TX) sends a signal across some medium 14 (or channel) to a receiver 16 (RX). It is of key importance to note that the signal 18 at RX is not the same produced by TX 110 due to the distortion introduced by the channel.

A Fourier Transform allows the transmitted signal to be converted between the time and frequency domains. A special form of the Fourier Transform takes complex numbers in the frequency domain and converts them to real numbers in the time-domain domain. This is achieved by the Real Inverse Fourier Transform and can be reversed by the Real Fourier Transform. This transform forms the basis of many OFDM systems.

Figure 2:
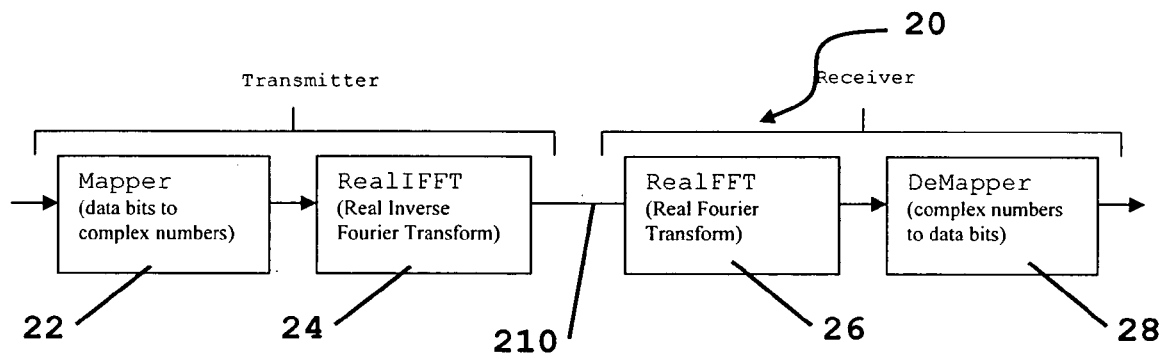
FIG. 2 illustrates a simplified OFDM communications system.

FIG. 2 shows an idealised OFDM communications system 20 (i.e. one in which the channel produces no change in the transmitted signal).

The transmitter includes a Mapper 22 that maps data bits to complex numbers. The Inverse Fourier transform 24 takes the data to encode into each of the sub channels and produces a block of output data (symbol) that is then transmitted. In order to correctly decode this data the receiver must be aligned to the start the symbol. Since there can be no direct link between the receiver and transmitter the start of the symbol must be inferred from the symbols sent.

The receiver includes a Real Fourier Transform 26 and a DeMapper 28 that maps complex numbers to data bits.

OFDM Systems may also have to address issues such as inter symbol interference, channel delay and attenuation, noise and equalisation.

The method according to the present invention works in the frequency domain. That is a symbol is received and processed with a Real Fourier Transform to produce a set of complex numbers.

In order to use the present method for symbol alignment the following conditions can be applied:

1. A known training symbol is transmitted
2. The training symbol should be sent without a cyclic prefix
3. The training symbol must be sent repeatedly In order to detect the start of data transmission the following is required:

1. At the end of the training sequence, once symbol alignment has been achieved, the exact opposite of the symbol sent for alignment should be transmitted.
2. Data transmission should start a known amount of time afterwards.

Homeplug 1.0 is a specification, published by the Homeplug Powerline Alliance, for powerline communication systems. The transmission medium is electrical wiring.

Figure 3:
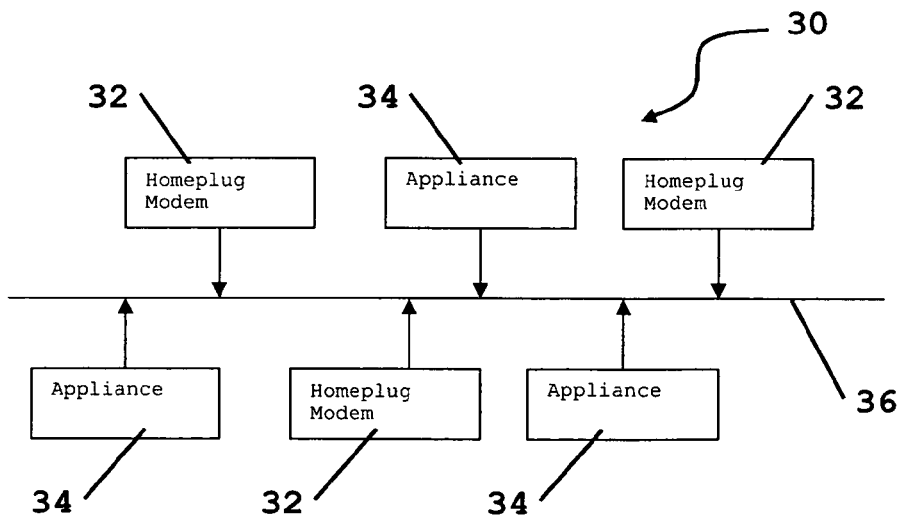
FIG. 3 illustrates a Homeplug network.

FIG. 3 shows a typical electrical network 30 with three Homeplug modems 32 (stations) installed. Each of the modems must be able to communicate with any of the other modems on the network. Also sharing the network are a number of appliances 34. While these do not actually take part in communication they do share the electrical wiring 36 and affect the channel over which the modems must communicate.

As multiple stations share the network, data is sent in bursts called packets. At the start of each packet is a preamble that contains the training symbols.

Figure 4A:
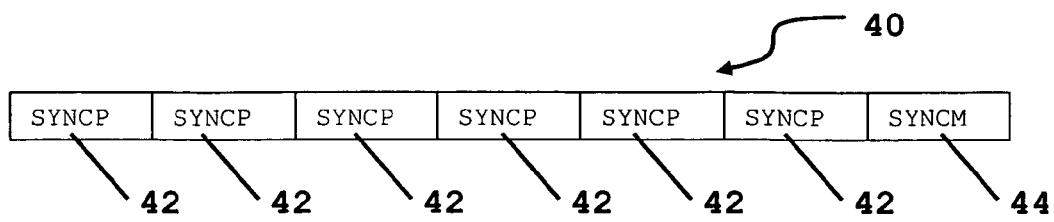
FIG. 4 illustrates the structure of the preamble and the SYNCP and SYNCM symbols represented in the time domain along with their magnitude spectra, in accordance with a preferred embodiment of the present invention.

FIG. 4a shows the structure of the preamble 40. The SYNCP symbol 42 is 256 samples long (corresponding to the 256 point Real Fourier Transform used) and has a known structure in the time and frequency domains. The SYNCM symbol 44 is also 256 samples long and is the inverse of the SYNCP symbol.

The synchroniser is required to detect the presence of the preamble, find the correct symbol alignment position then detect the transition from the final SYNCP to SYNCM in order to decode the data that follows.

Figure 4B:
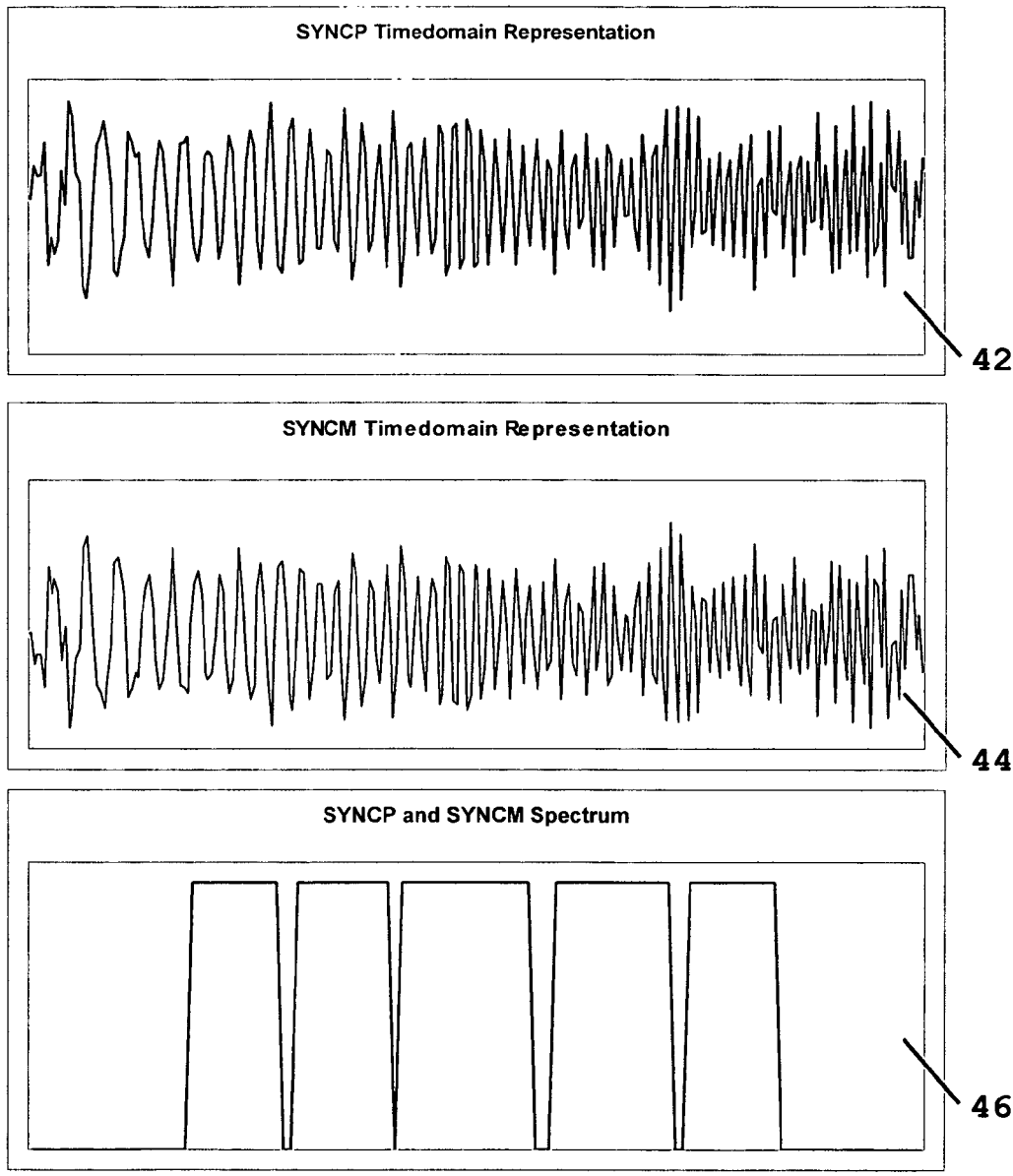

FIG. 4b shows the SYNCP 42 and SYNCM 44 symbols represented in the time domain and their magnitude spectra 46. The following formula generates the complete preamble in the time domain:

$$\frac{\sin \cdot w[n] \cdot 2}{\sqrt{84}} \cdot \sum_c \cos\left(\frac{2 \cdot \pi \cdot (c+23) \cdot n}{256} + \partial c\right)$$

In the synchroniser data is received in blocks of N samples and converted to the frequency domain. This procedure produces (up to) N/2 complex numbers in the format:

$$Zn = A + iB$$

In this formula A and B are called the real and imaginary parts.

The vector shown can be uniquely represented in either Cartesian coordinates or in Polar coordinates. Polar coordinates provide the angle between the positive real axis and the vector (measured anticlockwise) and the length of the vector. Polar coordinates can be derived from Cartesian coordinates using the following equations:

$$\text{Angle} = \arctan(B/A)$$

$$\text{Magnitude} = \sqrt{A*A + B*B}$$

The angle is often called the phase of the complex number.

Figure 5:
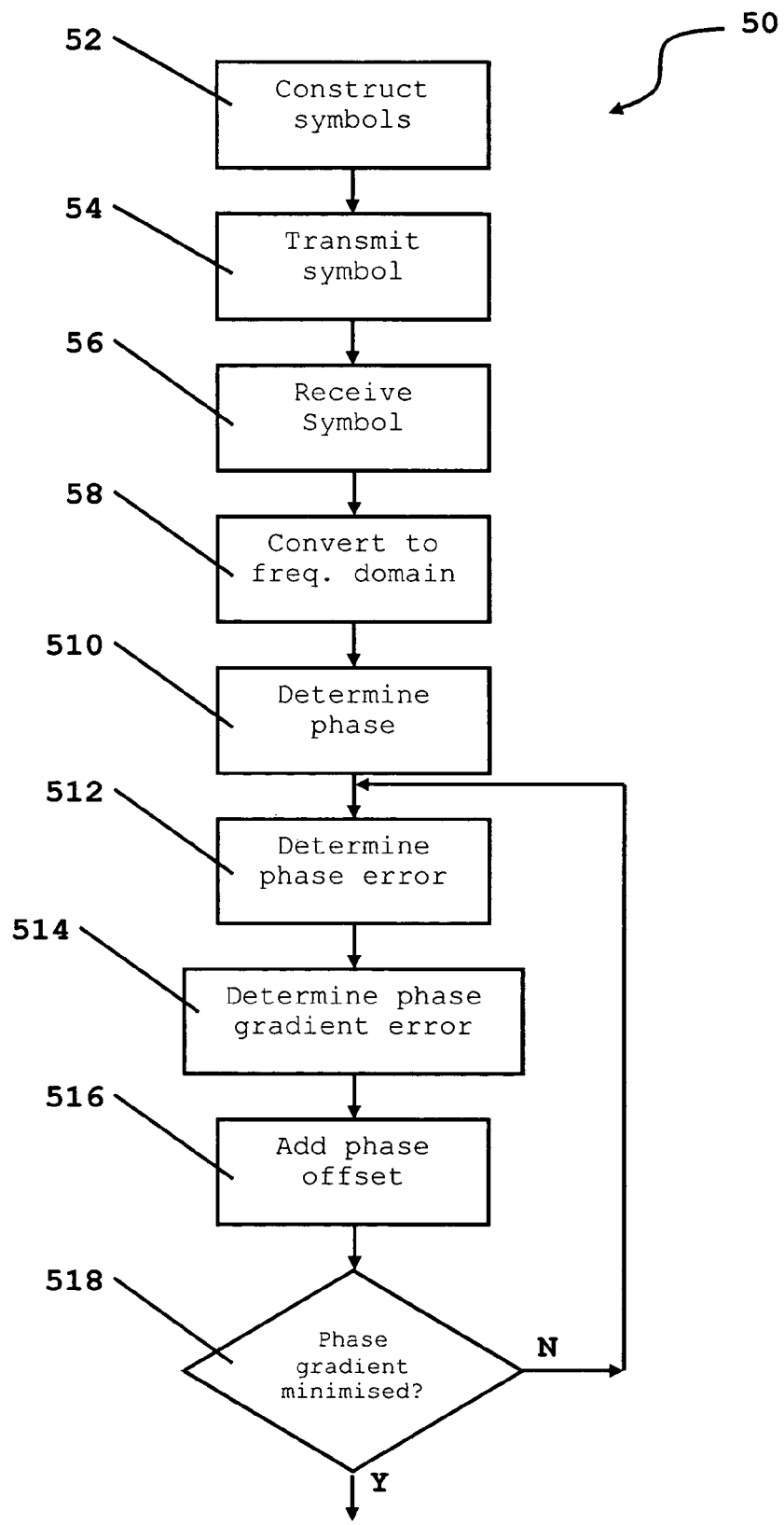
FIG. 5 illustrates a flowchart of the method according to a preferred embodiment of the present invention.

FIG. 5 illustrates the synchronisation method 50 according to a preferred embodiment of the present invention. After the preamble and data symbols are constructed 52 and transmitted 54, the method works as follows:
1. Receive 56 a symbol of 256 samples
2. Convert 58 the symbol to the frequency domain
3. Convert from Cartesian coordinates to Polar coordinates and calculate phases 510 in the range 0 to $2\pi$.
4. Subtract 512 the known transmitted phase of each carrier from the received phase
5. Generate 514 the phase gradient error metric
6. Add 516 a phase offset to each received phase equivalent to stepping N samples in the time domain
7. Repeat steps 4 through 6.

The correct synchronisation position is then derived from the iteration at which the phase gradient error metric is minimised 518.

Each carrier must be rotated by a different amount during the synchronisation calculation to iterate though each possible synchronisation position. In polar coordinates this simply means adding a value to the phase modulo $2\pi$. Let each symbol be comprised of N samples. For each carrier $C_m$, where $0 < m < N/2$, the phase rotation, Pm, corresponding to 1 sample is given by:

$$Pm = 2*\pi*m/N$$

The phase gradient error metric is calculated as follows with the definitions:
N: number of samples per symbol
$0 < m < N/2$: Carrier index
$PR_m$: Received phase of carrier m
$PT_m$: Transmitted (reference) phase of carrier m
$PE_m = PR_m - PT_m$: Error between the received and transmitted phase
$PG_m = PE_{m+1} - PE_m$: Gradient between adjacent phase errors
The final metric is found by summing all $PG_m$ values:

Phase Gradient Error Metric=

$$\sum_{m=1}^{N/2-2} PGm$$

Figure 6:
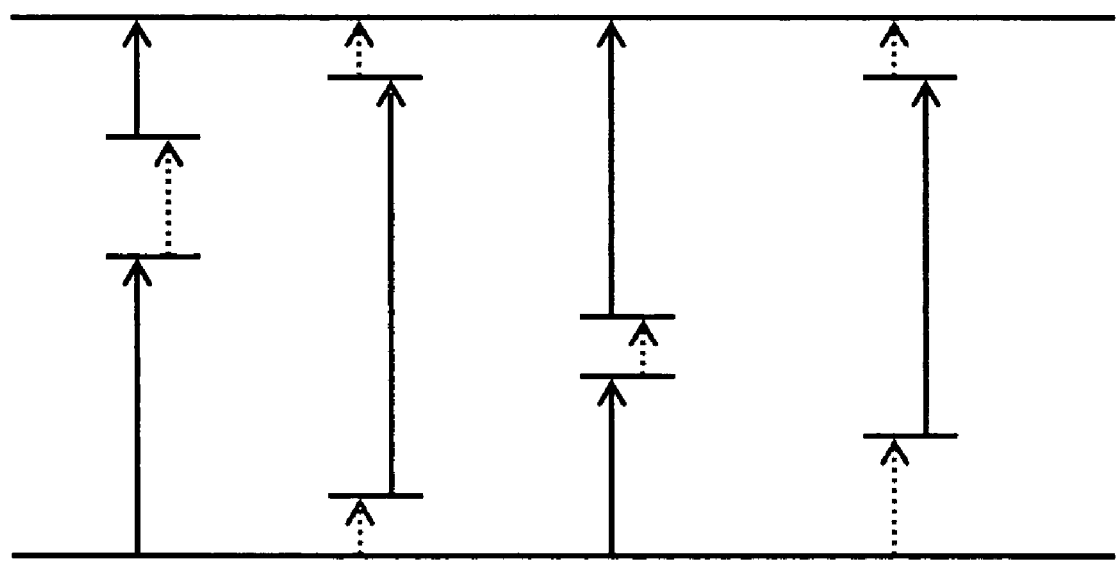
FIG. 6 illustrates cases for selecting the shortest distance between phases.

Generating the PGm values requires special attention. It is important to note that all phase arithmetic is performed modulo $2\pi$. To make the subtraction well defined the shortest distance between the two phases must be found. FIG. 6 illustrates four possible cases. In each case the vector represented by the dotted line indicates the selected difference value. Where the vectors are split the sum of the two parts is used.

While the phase gradient error metric identifies the synchronisation position it is unable to find the boundary between the SYNCP and SYNCM symbols and therefore where data transmission starts.

To identify this boundary note that the SYNCP and SYNCM symbols are exactly the inverse of each other. Let $PP_m$ be the phase of carrier m in the previous symbol and $PC_m$ be the phase of carrier m in the current symbol. We now define the symbol phase difference to be:

$$PD = \sum_{m=1}^{m=N/2-1} PPm - PCm$$

This value will be minimised between SYNCP symbols and maximised between the SYNCP and SYNCM symbols allowing the correct identification of the boundary.

Figure 7:
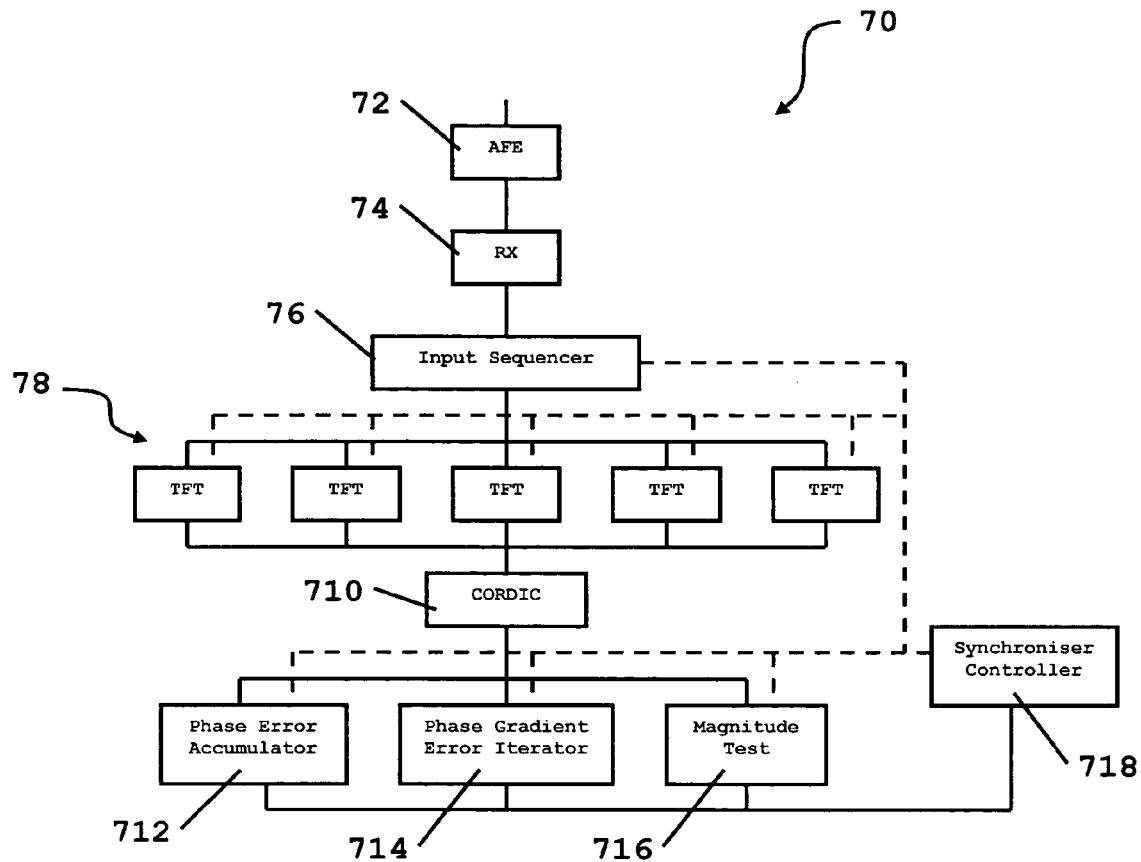
FIG. 7 illustrates a synchroniser hardware architecture in accordance with a preferred embodiment of the present invention.

FIG. 7 shows the architecture of the overall synchroniser 70 implemented in an Xilinx® Virtex™-II 6000 FPGA (Field Programmable Gate Array) running at 50 MHz. The synchroniser can be implemented in FPGAs with 600,000 gates, in C code, or in a high performance (GHz clocked) DSP for example available from Texas Instruments®. Each individual component will be discussed in the following sections. The following first provides a brief overview.

Digital time domain samples are converted from electrical voltages by the AFE (Analogue Front End) 72. These are received by RX 74 and passed to the Input Sequencer 76. The input sequencer allows a programmable number of samples to be skipped in order to align the data stream. Samples are passed to the TFT units 78 to calculate the Fourier transform for all analysed carriers. After 256 input samples the TFT outputs become valid and they are passed through the CORDIC (COordinate Rotation DIgital Computer) 710 for conversion to polar coordinates. Phases enter the Phase Error Accumulator 712 and Phase Gradient Error Iterator 714 while the magnitude is passed to Magnitude Test 716. These modules generate the metrics and synchronisation position required for the synchroniser controller 718 to make decisions about the incoming data stream and perform synchronisation.

During the synchronisation calculation it is necessary to drop samples in order to align to the symbol boundary. The input sequencer 76 reads incoming data and can be programmed by the synchroniser statemachine to drop a specified number of samples to align to a symbol boundary.

The TFT 78 is used to calculate the Fourier Transform of the incoming data. Each TFT module calculates the discrete Fourier transform of one tone according to the following formulae:

$$\text{Real} = \sum_{m=0}^{255} Sm * Wmr$$

$$\text{Imag} = \sum_{m=0}^{255} Sm * Wmi$$

Where:
$S_m$=Sample m
$W_{mr}$=Real part of $W_m$
$W_{mi}$=Imaginary part of $W_m$
$W_m$=$m^{th}$ complex root of unity The complex roots of unity are stored in a ROM. Due to symmetry that exists within the complex roots we need only store the first 64 elements rather than all 256 as the rest can be generated using reflections in the primary axis.

The output of each TFT unit 78 is a complex number in Cartesian coordinates. The complex output is valid some clock cycles after the final data sample (depending on the TFT pipeline depth).

The CORDIC 710 converts the output of the TFT units into a phase and magnitude representation. The CORDIC phase output is scaled such that $\pi$ is a power of 2. The CORDIC can accept one new input every cycle and produces the output after a configurable latency depending on the required accuracy.

The phase error accumulator 712 compares phases between the previous and current symbols and accumulates the total error.

Each magnitude calculated by the CORDIC is tested against a predefined threshold. The total number of magnitudes that pass the test is counted.

Figure 8:
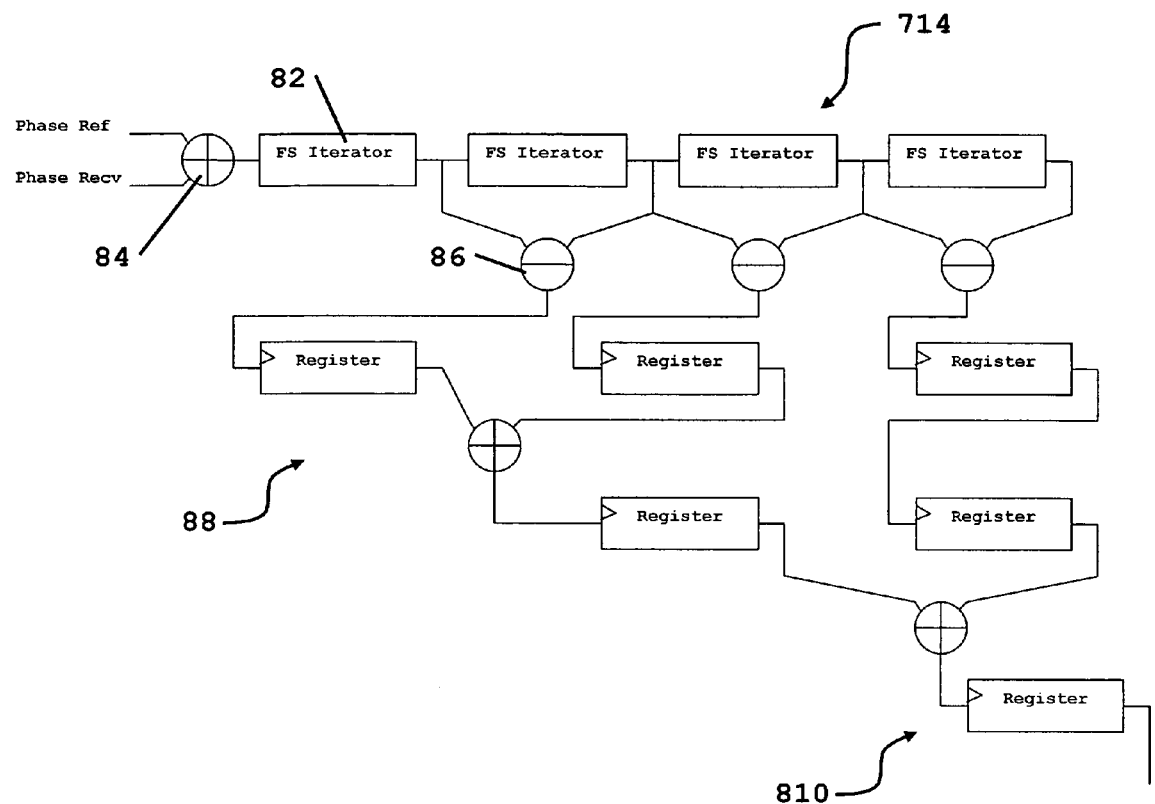
FIG. 8 illustrates a Phase Gradient Error Iterator.

The phase gradient error iterator 714 shown in FIG. 8 is used to find the actual alignment position. It can be configured to analyse as many or a few tones as required for the given application. FIG. 8 shows it configured to analyse 4 tones.

As the phase outputs of the CORDIC become available they are shifted into the FS Iterator chain. The adder 84 at the start is used to subtract the reference phase for that carrier (note—using modulo $2\pi$ arithmetic, a−b=a+(($2\pi$)−b)).

Once all phase inputs have been loaded into the FS iterator chain they begin the synchronisation calculation. Each FS iterator adds a predefined constant to the current value which equates to a shift by N samples in the time domain. In parallel adjacent tones are subtracted 86 from each in order to generate the phase gradient error. These values then pass through an adder tree 88 that, after some number of clock cycles, sums together all the error values thus producing the final phase gradient error metric 810.

Figure 9:
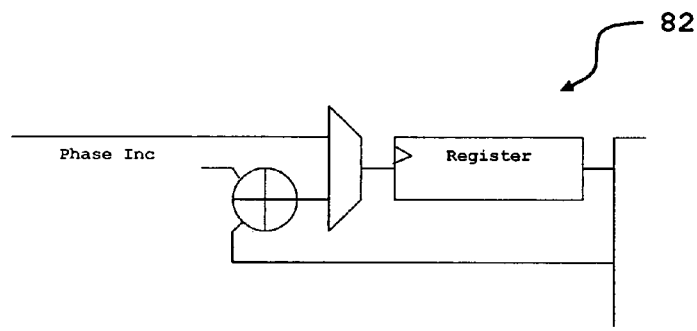
FIG. 9 illustrates a FS Iterator.

FIG. 9 shows an FS Iterator.

Figure 10:
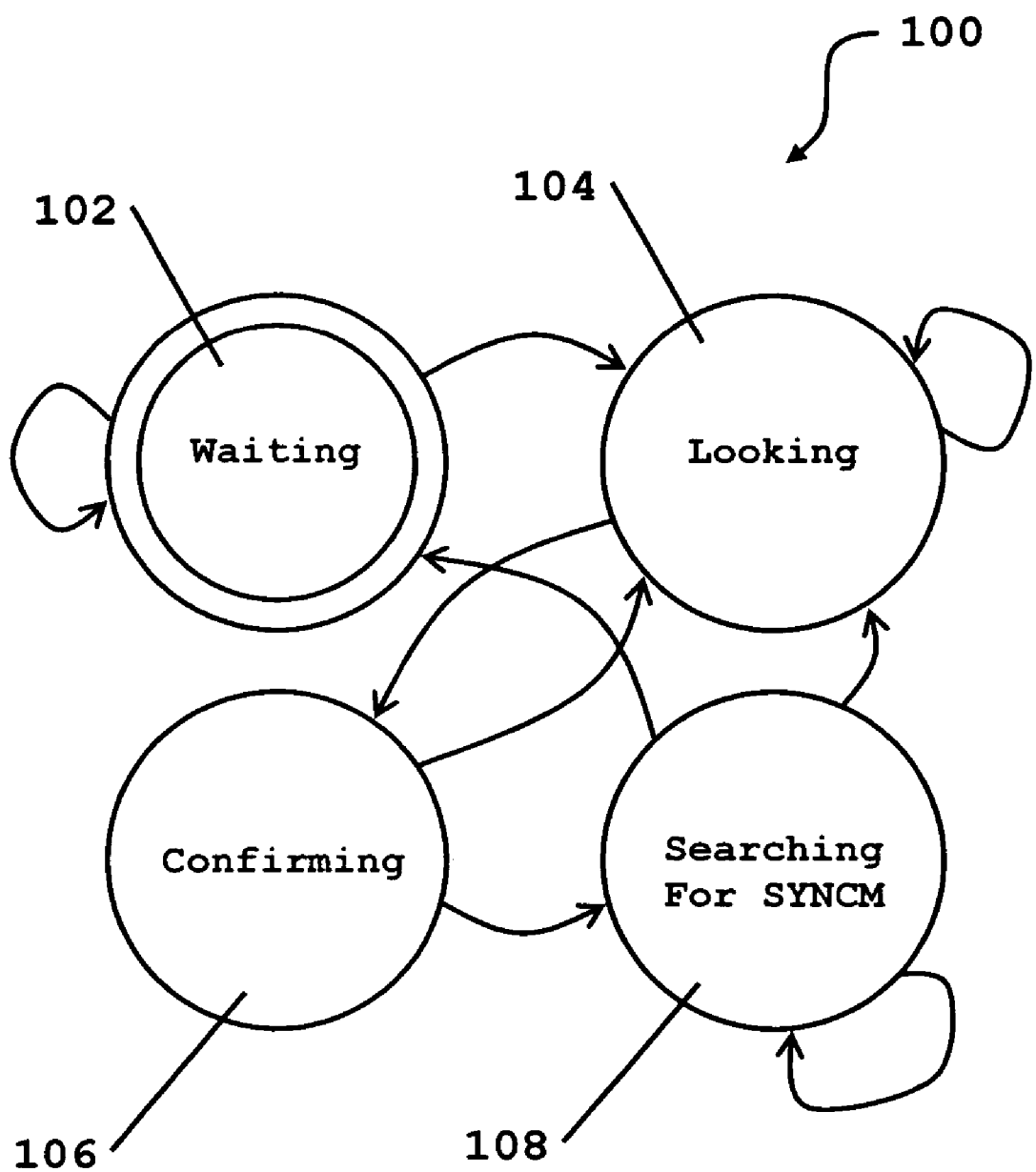
FIG. 10 illustrates the synchronisation state machine.

The synchroniser controller is used to coordinate the operation of the circuit and make decisions based on the metrics calculated. The alignment state machine is shown in FIG. 10. The states are: Waiting 102; Looking 104; Confirming 106; and Searching for SYNCM 108.

The transitions shown are described in Table 1. Each transition occurs as soon as all metrics are available.

For the metrics to pass the following must all be true:
1. Minimum Phase Error Gradient less than threshold.
2. Number of magnitudes that passed greater than threshold.
3. If state is not "Looking" then newly calculated alignment position must be 0 to within some tolerance (note that when leaving state "Looking" the synchroniser automatically aligns therefore we do not expect to have to align again).

The synchroniser can be scaled to trade circuit area with reliability. The main way in which this is done is by changing the number of tones analysed by the synchroniser. This impacts the number of TFT units and the size of the Phase Gradient Error Iterator.

Internally the precision of each part of the synchroniser can be altered. This includes:
Number of bits used for phase arithmetic
Number of stages used in CORDIC
Precision of TFT Rom and size of TFT accumulators
Precision of Phase Gradient Error Iterator data path (required precision is a function of the number of analysed tones) and width and depth of the adder tree (including number of inputs to each adder).

The present invention allows the alignment position of symbols to be calculated and allows the detection of the transition between training symbols and data transmission.

In another embodiment of the present invention, the system and method are used in an ADSL modem.

In this case the specific training sequence used is much longer than that used with a powerline system and is implemented on a low performance CPU rather than in hardware. In this case the longer training sequence allows the calculation to be spread over time i.e. the high performance of the hardware design is not required for this training sequence). Nonethe-less the actual calculation for finding the alignment position is substantially identical to that used for the Powerline system. The system and method of the present invention is equally applicable in Wireless, xDSL, Powerline, HyperLAN, 802.11a and DVB systems.

Further modifications and improvements may be added without departing from the scope of the invention herein described.

The invention claimed is:

1. A method of synchronising an Orthogonal Frequency Division Multiplexed (OFDM) signal in a communications network, the OFDM signal comprising a plurality of OFDM signal portions with each of the OFDM signal portions comprising a plurality of mutually orthogonal modulated carriers which have been modulated with a respective one of a plurality of known, predetermined symbols, the method comprising the steps of:
   for each of the OFDM signal portions:
      a) receiving a respective OFDM signal portion in a receiver, the respective OFDM signal portion having been sent across a channel,
      b) determining a received phase of each of the plurality of mutually orthogonal modulated carriers of the received OFDM signal portion,
      c) subtracting a predetermined, transmitted phase of each of the plurality of mutually orthogonal modulated carriers from a respective received phase to provide a phase error for each of the plurality of mutually orthogonal modulated carriers of the received OFDM signal portion,
      d) determining a plurality of phase error differences of the received OFDM signal portion, each phase error difference being a difference between phase errors of a different pair of adjacent modulated carriers,
      e) summing the plurality of phase error differences to produce a phase error difference value for the received OFDM signal portion,
      f) adding a predetermined phase offset value to each of the received phases determined at step b),
      g) carrying out steps c) to f) in respect of each of the plurality of modulated carriers of the received OFDM signal portion with the phase offset value added, and
      h) determining a synchronisation position for the received OFDM signal portion based on a minimum of the produced phase error difference values for the received OFDM signal portion; and
   identifying a boundary between two of the known, predetermined symbols based on the determined synchronisation positions associated with the received plurality of OFDM signal portions and a phase difference between adjacent known, predetermined symbols.

2. The method according to claim 1, further comprising converting the respective OFDM signal portion to the frequency domain before carrying out step b).

3. The method according to claim 1, wherein the predetermined phase offset value added at step f) corresponds to one sample of the respective OFDM signal portion.

4. The method according to claim 3, wherein the predetermined phase offset value added at step f) is 2*n*m/N, where m is the number of modulated carriers and N is the number of samples of the respective OFDM signal portion.

5. The method according to claim 3, wherein steps f) and g) are repeated N-1 times, with the predetermined phase offset value corresponding to one sample being added each time, where N is the number of samples of the respective OFDM signal portion.

6. The method according to claim 1, further comprising receiving at least one further OFDM signal portion in the receiver, the at least one further OFDM signal portion comprising a plurality of mutually orthogonal modulated carriers, which have been modulated with the known, predetermined symbol and carrying out steps b) to h) in respect of each of the at least one further OFDM signal portion.

7. The method according to claim 1, further comprising comparing the minimum of the produced phase error difference value with a predetermined threshold value.

8. The method according to claim 1, further comprising receiving a further OFDM signal portion in the receiver, the further OFDM signal portion comprising a plurality of mutually orthogonal modulated carriers, which have been modulated with the known, predetermined symbol and carrying out steps b) to e) to determined a phase error difference value, said phase error difference value being compared to a predetermined error threshold value.

9. The method according to claim 1, further comprising:
receiving a further OFDM signal portion in the receiver, the further OFDM signal portion comparing a plurality of mutually orthogonal modulated carriers, which have been modulated with a second known, predetermined symbol, the second known, predetermined symbol being 180° out of phase with the first known, predetermined symbol; and
receiving at least one yet further OFDM signal portion a predetermined period of time after the second known, predetermined symbol, the at least one yet further OFDM signal portion comprising a plurality of mutually orthogonal modulated carrier which have been modulated with transmitted data symbols.

10. Apparatus for synchronising an Orthogonal Frequency Division Multiplexed (OFDM) signal in a communications network, the OFDM signal comprising a plurality of OFDM signal portions with each OFDM signal portion comprising a plurality of mutually orthogonal modulated carriers which have been modulated with a respective one of a plurality of known, predetermined symbols, the apparatus comprising:
a receiver operative to receive each OFDM signal portion, each respective OFDM signal portion having been sent across a channel, and
a phase gradient iterator operative for each OFDM signal portion to:
a) determine a received phase of each of the plurality of mutually orthogonal modulated carriers of the received OFDM signal portion,
b) subtract a predetermined, transmitted phase of each of the plurality of mutually orthogonal modulated carriers from a respective received phase to provide a phase error for each of the plurality of mutually orthogonal modulated carriers of the received OFDM signal portion,
c) determine a plurality of phase error differences of the received OFDM signal portion, each phase error difference being a difference between phase errors of a different pair of adjacent mutually orthogonal modulated carriers,
d) sum the plurality of phase error differences to produce a phase error difference value for the received OFDM signal portion,
e) add a predetermined phase offset value to each of the received phases determined at step a),
f) carry out steps b) to e) in respect of each of the plurality of mutually orthogonal modulated carriers of the received OFDM signal portion with the phase offset value added, and
i) determine a synchronisation position for the received OFDM signal portion based on a minimum of the produced phase error difference values for the received OFDM signal portion; and
identifying a boundary between two of the known, predetermined symbols based on the determined synchronisation positions associated with the received plurality of OFDM signal portions and a phase difference between adjacent known, predetermined symbols.

11. Apparatus according to claim 10 further comprising a synchronisation controller operative to control the apparatus according to claim 10 and make decisions concerning synchronisation of the OFDM signal based on a determined synchronisation position.

12. Apparatus according to claim 10 further comprising Fourier Transform means operative to convert the respective OFDM signal portion to the frequency domain before the received phase of each of the plurality of modulated carriers is determined by the phase gradient iterator.

* * * * *